US010480699B2

(12) United States Patent
Meister et al.

(10) Patent No.: US 10,480,699 B2
(45) Date of Patent: *Nov. 19, 2019

(54) PERMANENT QUICK CONNECTOR AND ASSEMBLY THEREWITH

(71) Applicant: Miniature Precision Components, Inc., Walworth, WI (US)

(72) Inventors: Brandon Meister, Allis, WI (US); Tyler Walczak, Muskego, WI (US); William Kahabka, Delevan, WI (US); Tim Hammond, Clinton, WI (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,536

(22) Filed: May 21, 2018

(65) Prior Publication Data

US 2018/0266606 A1    Sep. 20, 2018

Related U.S. Application Data

(63) Continuation of application No. 15/211,344, filed on Jul. 15, 2016, now Pat. No. 10,006,577.

(51) Int. Cl.
F16L 37/244 (2006.01)
F16L 37/098 (2006.01)

(52) U.S. Cl.
CPC ......... F16L 37/244 (2013.01); F16L 37/0985 (2013.01)

(58) Field of Classification Search
CPC ........................... F16L 37/098; F16L 37/0985

USPC ........................................................ 285/314
See application file for complete search history.

(56) References Cited

U.S. PATENT DOCUMENTS

| 5,356,181 | A  | 10/1994 | Shirogane et al. |
| 5,607,190 | A  | 3/1997  | Exandier et al. |
| 5,785,358 | A  | 7/1998  | Kujawski et al. |
| 6,402,204 | B1 | 6/2002  | Stuart et al. |
| 6,595,556 | B1 | 7/2003  | Zenko et al. |

(Continued)

FOREIGN PATENT DOCUMENTS

| EP | 2228582 A1 | 9/2010 |
| JP | 2012011797 A | 1/2012 |
| WO | WO2014019757 A1 | 2/2014 |

Primary Examiner — David Bochna
(74) Attorney, Agent, or Firm — Dickinson Wright PLLC

(57) ABSTRACT

A quick connector and assembly therewith is provided. The connector includes a housing having a tubular housing wall with an inner surface extending between open opposite ends with at least one locking opening extending through the wall. The inner surface bounds a through bore and forms a radially inwardly extending shoulder. A retaining member has an annular retainer wall with inner surface sized for receipt about at least a portion of the housing wall. The retainer wall has at least locking member resiliently biased radially inwardly for receipt through the opening of the housing wall in axially spaced relation from the shoulder by a gap, in which the annular collar of the insertion member is received and locked. The at least one locking member is restrained against substantial axial and rotational movement within the at least one opening, and thus, prevents unwanted removal of the insertion member from the housing.

20 Claims, 6 Drawing Sheets

(56) References Cited

U.S. PATENT DOCUMENTS

| | | |
|---|---|---|
| 6,851,721 B2 | 2/2005 | Poder |
| 7,566,079 B1 | 7/2009 | Callahan et al. |
| 8,297,659 B2 | 10/2012 | Callahan et al. |
| 10,006,577 B2 * | 6/2018 | Meister ............... F16L 37/0985 |
| 2003/0160448 A1 | 8/2003 | Takayanagi |
| 2003/0197374 A1 | 10/2003 | Miyajima |
| 2007/0120362 A1 | 5/2007 | Poder |
| 2008/0048447 A1 | 2/2008 | Yoshino |
| 2010/0032937 A1 | 2/2010 | Kerin et al. |
| 2012/0119485 A1 | 5/2012 | Cichorek et al. |
| 2014/0284915 A1 | 9/2014 | Arnold et al. |
| 2017/0152979 A1 | 6/2017 | Klein et al. |
| 2017/0152980 A1 | 6/2017 | Klein et al. |

* cited by examiner

PERMANENT QUICK CONNECTOR AND ASSEMBLY THEREWITH

CROSS REFERENCE TO RELATED APPLICATION

This U.S. utility patent application is a continuation of U.S. patent application Ser. No. 15/211,344 filed Jul. 15, 2016, now U.S. Pat. No. 10,006,577, the contents of which are incorporated herein by reference in its entirety.

BACKGROUND OF THE INVENTION

1. Field of the Invention

The present disclosure relates generally to a quick connector for establishing a union between conduits, and more particularly to a quick connector for permanently locking an insertion member therein to prevent disassembly of the insertion member therefrom.

2. Related Art

This section provides background information related to the present disclosure which is not necessarily prior art.

As is well known, a type of coupling, commonly referred to as a "quick connector," is used to quickly and simply connect tubes or conduits to one another. Quick connectors connect an insertion member to a receiving member to convey mediums therethrough, such as in a variety of liquid and gas systems, to provide a connection between a pair of conduits for establishing a continuous flow path therebetween. For example, in automotive applications, quick connectors are used in various air/vapor management systems, such as evaporative emissions systems, crankcase ventilation systems, and brake boost and engine vacuum systems. In addition to these gas management systems, quick connectors can also be used in fluid delivery systems such as, for example, liquid fuel and windshield washer applications. Some of the benefits of present quick connectors in automotive applications include ease of assembly, reduction in potential leak paths, enhanced ability for containment of hydrocarbon emissions, and ability to quickly disconnect the insertion member from the quick connector, such as during service.

Despite the benefits of known quick connectors, a need still exists to provide a mechanism for making a reliable connection between an insertion member and a quick connector without having to employ costly mechanisms to ensure a reliable connection has been established. Current quick connectors require costly electronic sensor mechanisms configured in communication with a vehicle central processing unit to indicate proper connections have been established and are being maintained. Although generally effective, the costs associated therewith can be problematic. Further yet, in some cases the sensor may send a false signal indicating the quick connector and the insertion member have become detached from one another, when in fact they may not be disconnected. In this instance, the vehicle owner typically has the vehicle serviced in response to an indicator light on the vehicle dashboard. With this, problems, whether real or not, can arise with current quick connectors configured in communication with a sensor to ensure a proper connection has been established.

A quick connector constructed in accordance with the present disclosure and assembly therewith overcomes at least those the problems discussed above, and likely others, which will become readily apparent to one skilled in the art upon viewing the entirety of the disclosure herein.

SUMMARY OF THE INVENTION

This section provides a general summary of the disclosure and is not intended to represent a comprehensive summary of all of its features, advantages, aspect and/or objectives.

It is an aspect of the present disclosure to provide a quick and reliable mechanism in which to ensure a reliable, fluid/gas-tight seal has been established between a plurality of components of a quick connector used to form a fluid/gas-tight connection between conduits. The mechanism includes providing at least one locking member that forms a permanent connection between members of the quick connector to prevent separation of the members from one another, absent breaking one of the members. Accordingly, a quick connector constructed in accordance with the disclosure assures the "as fully assembled" members of the quick connector will not become inadvertently detached from one another, thereby doing away with the need for elaborate sensor mechanisms typically employed to indicate a proper connection is maintained or to otherwise indicate separation of connector members from one another has occurred. As such, a quick connector and assembly therewith in accordance with the disclosure reduces the complexity of assembling the quick connector into a vehicle by doing away with the need to operably associate a sensor therewith. As a result, a quick connector and assembly therewith in accordance with the disclosure prevents the occurrence of a false indication of separation between the connector members, which in turn prevents the vehicle from being unnecessarily serviced.

A quick connector for permanently locked, non-disconnectable receipt of a tubular male insertion member, having a radially outwardly extending annular collar located between opposite ends, therein to facilitate establishing a connection between conduits is provided. The quick connector includes a housing having a tubular housing wall with an inner surface and an outer surface extending along a central longitudinal axis between open opposite ends with at least one locking opening extending through the housing wall. The inner surface bounds a through bore and has a shoulder extending radially inwardly from at least a portion thereof. The quick connector further includes a retaining member having an annular retainer wall with inner and outer surfaces extending axially along the central longitudinal axis between open proximal and distal ends. The inner surface of the retaining member is sized for receipt about at least a portion of the outer surface of the housing wall. The retainer wall has at least one locking member cantilevered by an elongate arm fixed to the retainer wall. The elongate arm biases the at least one locking member radially inwardly through the at least one opening to deploy the at least one locking member radially inwardly from the inner surface of the tubular wall in axially spaced relation from the shoulder by a gap sized for captured receipt of the annular collar of the tubular male insertion member. The at least one locking member is restrained against substantial axial and rotational movement within the at least one opening to prevent removal of the at least one locking member from the at least one opening.

In accordance with another aspect of the invention, an annular flange can be provided to extend radially outwardly from the outer surface of the housing. The annular flange has at least one notch, wherein at least one tab extending axially from the distal end of the retaining member is configured for receipt in the at least one notch to prevent substantial relative rotation between the housing and the retaining member, thereby further assuring the housing and the retaining member remain fixedly attached with one another.

In accordance with another aspect of the invention, the at least one locking member can be formed having opposite radially facing surfaces, opposite axially facing surfaces facing the proximal and distal ends, and opposite sides extending between the opposite radially facing surfaces and the opposite axially facing surfaces, wherein the opposite sides are substantially flat, radially extending surfaces configured to prevent substantial relative rotation between the housing and the retaining member, thus, further assuring the housing and the retaining member remain fixedly attached against unwanted separation from one another.

In accordance with another aspect of the invention, the at least one opening can be formed having substantially flat sides configured to confront the opposite sides of the at least one locking member to prevent substantial relative rotation between the housing and the retaining member, thus, further assuring the housing and the retaining member remain fixedly attached against unwanted separation from one another.

In accordance with another aspect of the invention, the axially facing surface of the locking member facing the proximal end of the retaining member can be formed having a radially outwardly facing first inclined surface and a radially inwardly facing second inclined surface, with the first and second inclined surfaces converging toward the proximal end to facilitate assembly of the insertion member therein and to increase the locking force against the insertion member under tension between the housing and the retaining member.

In accordance with another aspect of the invention, a sleeve can be provided to overly the at least one locking member to further prevent the at least one locking member from moving radially outwardly from the at least one opening, thereby adding a redundant mechanism for assuring the insertion member remains fully locked with the quick connector.

In accordance with another aspect of the invention, the sleeve can be provided as a heat-shrinkable tube to facilitate quick, reliable and easy assembly.

In accordance with another aspect of the invention, a quick connector assembly is provided. The quick connector assembly includes a tubular male insertion member having a radially outwardly extending annular collar located between opposite ends. The assembly further includes a housing having a tubular housing wall with an inner surface and an outer surface extending along a central longitudinal axis between open opposite ends with at least one locking opening extending through the housing wall. The inner surface bounds a through bore and presents a shoulder extending radially inwardly from at least a portion thereof. The assembly further includes a retaining member having an annular retainer wall with inner and outer surfaces extending axially along the central longitudinal axis between open proximal and distal ends. The inner surface of the retaining member is sized for receipt about at least a portion of the outer surface of the housing wall. The retainer wall has at least one locking member cantilevered by an elongate arm fixed to the retainer wall, with the elongate arm biasing the at least one locking member radially inwardly through the at least one opening to position the locking member radially inwardly from the inner surface of the tubular wall. The annular collar of the tubular male insertion member is disposed between the shoulder and the at least one locking member in axial alignment therewith. The at least one locking member is restrained against substantial axial and rotational movement within the at least one opening and is locked within the at least one opening to prevent removal of the tubular male insertion member from the housing.

Further areas of applicability of the present invention will become apparent from the description and illustrations provided herein. The description and specific examples in this summary are intended for purposes of illustration only and are not intended to limit the scope of the present disclosure.

BRIEF DESCRIPTION OF THE DRAWINGS

These and other aspects, features and advantages of the invention will become more readily appreciated when considered in connection with the following detailed description, appended claims and accompanying drawings, in which:

DETAILED DESCRIPTION OF PRESENTLY PREFERRED EMBODIMENTS

Figure 1:
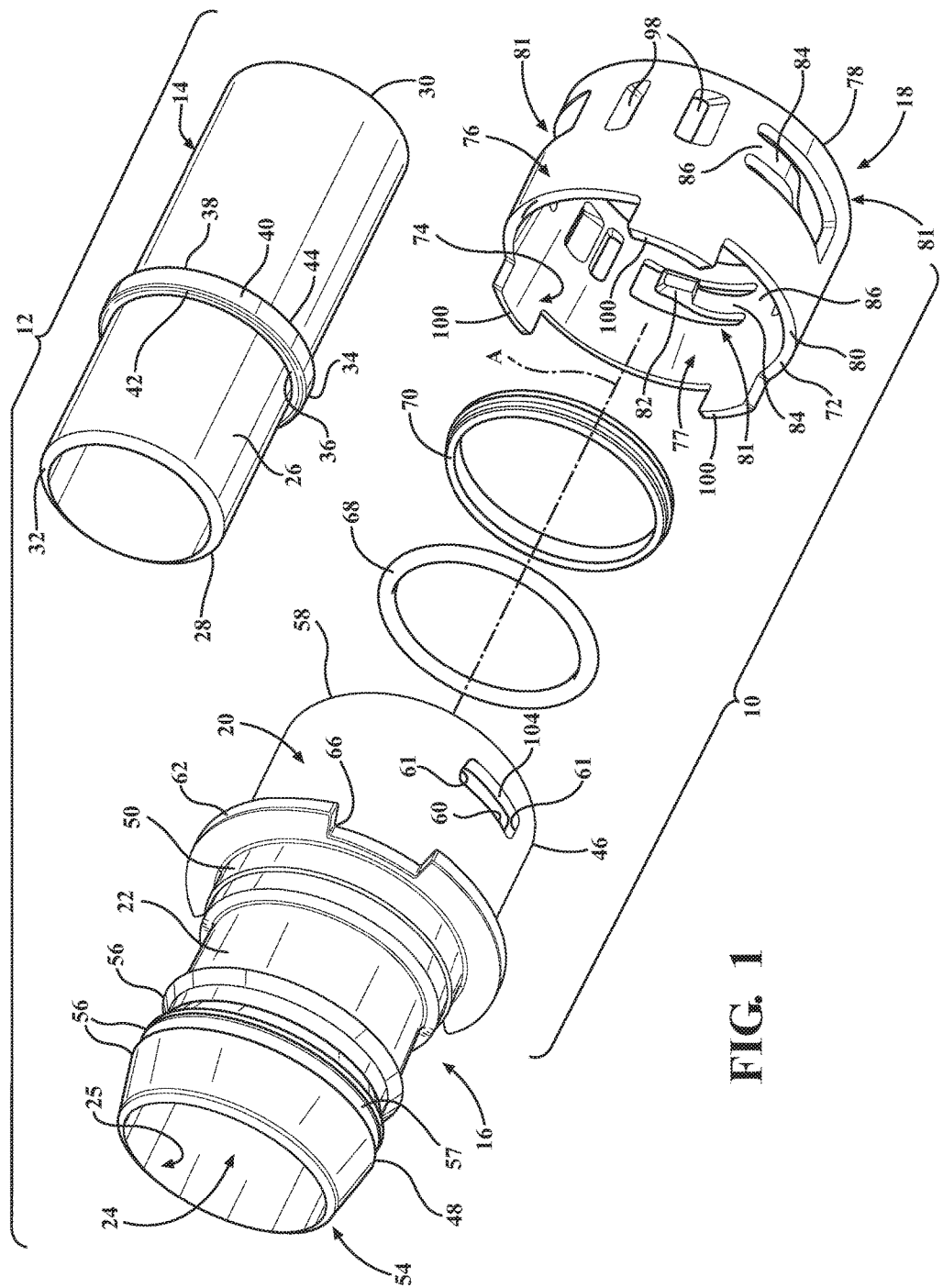
FIG. 1 is an exploded perspective view looking toward one side of a quick connector assembly shown constructed in accordance with one aspect of the invention.

Referring in general to all of the Figures, the present disclosure and teachings described herein are directed to quick connectors and assemblies therewith, of the type particularly well-suited for providing a fluid/gas tight connection (union) between conduits. While disclosed in accordance with one or more specific exemplary constructions, a quick connector 10 and assembly 12 therewith, of the present disclosure, may be configured other than as expressly shown and described. The inventive concepts disclosed herein are generally directed to an improved mechanism for forming and ensuring a fixed and permanent (without breaking at least one of the components), reliable, fluid/gas-tight connection is made between a tubular male insertion member 14 and a tubular receiving member, also referred to as housing 16, of the connector 10 via an intermediate annular retainer, also referred to as retaining member 18, of the connector 10. The improved quick connector 10 and assembly 12 form a reliable, fluid/gas-tight connection in such a manner as to do away with the need for costly sensor mechanisms to ensure and indicate the connection is made and maintained, as a result of the permanent connection established by the connector 10 (barring breaking or destroying one or more of the components). The connector 10 is economical in manufacture, in assembly and in use, and provides a quick, reliable way in which to ensure a fluid/gas-tight connection is established between conduits and will be maintained between the male insertion member 14 and the housing 16, with reassurance that any potential of inadvertent disconnection therebetween and tampering thereof is avoided.

During assembly, the retaining member 18 is disposed axially along a central longitudinal axis A of the assembly 10, which corresponds to a central longitudinal axis of the individual components 14, 16, 18, about an outer surface 20 of a generally cylindrical, generally tubular wall 22 of the housing 16. Upon disposing the retaining member 18 onto and about the housing 16, the retaining member 18 becomes automatically and permanently fixed thereon as a result of interlocking features, discussed in more detail below. Then, the insertion member 14 is inserted along the longitudinal axis A into a through bore 24 of the housing 14, which is bounded by an inner surface 25 of the housing 14, whereupon the insertion member 14 is brought to a fully assembled state, whereupon a fluid/gas-tight seal is perfected between the insertion member 14 and the housing 16. When full assembly has occurred between the insertion member 14 and the housing 16, the locking features of the insertion member 14 and retaining member 18 operatively cooperate with one another to lockingly engage the insertion member 14 with the housing 16. Upon being locked together, assurance is provided that the fluid/gas-tight connection therebetween will be maintained between the insertion member 14 and the housing 16 over the course of the useful life of the assembly 12 without having to employ costly sensor mechanisms in communication with a vehicle control unit, and the like. Accordingly, the connector 10 and assembly 12 therewith are cost efficient in assembly and in use.

The insertion member 14 includes a tubular shaft portion 26 that extends between opposite ends, with one end being an insertion end 28 and the opposite end being an attachment end 30, with the attachment end 30 being configured for operable attachment to a conduit (not shown). The insertion end 28 is shown as having a radiused lead-in surface in the form of a generally rounded nose 32 that generally tapers or reduces in diameter to the insertion end 28. The insertion member 12 further includes an assembly feature in the form of a collar, shown as being a circumferentially continuous annular collar 34, between the opposite ends 28, 30. The annular collar 34 extends radially outwardly from a generally cylindrical outer surface of the shaft portion 26 and is shown as being generally rectilinear in cross-section. The annular collar 34 has a radially outwardly extending, annular leading shoulder 36 and a radially outwardly extending, annular trailing shoulder 38 spaced from one another by an outer periphery 40 (FIG. 1). The leading shoulder 36 is shown as merging with the outer periphery 40 via a slightly rounded annular profile or corner 42, such that the corner 42 transitions the leading shoulder 36 in smooth arcuate fashion with the outer periphery. In contrast, the trailing shoulder 38 and the outer periphery 40 are shown as merging with one another at a generally sharp or square corner 44. The insertion member 12, as described, is a male conduit member and may be constructed from any desired material known in the art, including plastics, metals, or otherwise, wherein the insertion member 12 in one exemplary embodiment is a resinous tube.

The housing 14, as best shown in FIGS. 1, 2A, 3 and 5, includes the wall 22 having an enlarged diameter first cylindrical receiving portion 46, a reduced diameter second cylindrical portion 48, with a stepped intermediate diameter third cylindrical portion 50 extending between the first and second cylindrical portions 46, 48, wherein an annular upper shoulder 51 (FIG. 3) separates the upper first cylindrical receiving portion 46 from the intermediate third cylindrical portion 50 and an annular lower shoulder 53 separates the lower second cylindrical portion 48 from the intermediate third cylindrical portion 50. As such, the relative diameters are such that the first diameter is greater than the second and third diameter, and the third diameter is greater than the second diameter: D1>D3>D2.

The wall 22 forms an end nipple portion, also referred to as coupling portion 54, shown as having a plurality of consecutive annular ridges 56 along its outer periphery for operable attachment to a conduit 55 (FIG. 3) and an O-ring 57 to facilitate forming a fluid-tight seal with the mating conduit. The enlarged diameter receiving portion 46 extends to an open end 58, with the cylindrical wall 22 thereof having at least one, and shown as a plurality (three, by way of example and without limitation) of circumferentially spaced, locking openings 60 extending therethrough. The locking openings 60 are shown as being equidistantly spaced from one another, though it is anticipated that other spatial relationships are possible, and have opposite flat or substantially flat sides 61 extending in generally parallel relation with one another. The housing 16 further includes an annular flange 62 extending radially outwardly from the outer surface 20. The annular flange 62 is shown as extending outwardly from the region of the outer surface 20 where the receiving portion 46 transitions to the intermediate portion 50, wherein the locking openings 60 are formed between the flange 62 and the open end 58. The flange 62 has at least one notch, and shown as a plurality of notches 66 therein, wherein the notches 66 are shown as being spaced equidistantly from one another, by way of example and without limitation.

The bore of the receiving portion 46 is sized diametrically to receive at least one elastomeric annular seal member, shown as an elastomeric O-ring 68, wherein the O-ring 68 is shown as being seated against the upper shoulder 51 with an annular cylindrical spacer sleeve 70 being seated there against. It should be recognized the seal member could be configured other than as described and shown, as long a fluid-tight seal is formed thereby against the tubular shaft portion 26 of the insertion member 14 upon assembly and while in use.

The retaining member 16, as best shown in FIGS. 1, 2A, 3 and 4A-4D, includes a generally annular, tubular retainer wall, and shown as a generally cylindrical wall 72, having an inner surface 74 and an outer surface 76. The inner surface 74 of the wall 72 defines a bore, also referred to as through opening 77, sized for close fitting receipt about at least a portion of the outer surface 20 of the housing 16. The inner and outer surfaces 74, 76 extend axially along the central longitudinal axis A between open proximal and distal ends 78, 80. The retainer wall 72 has at least one locking mechanism 81 provided via a locking member, and shown as three locking members 82, by way of example and without limitation, cantilevered by a corresponding number of resilient, elongate arms 84 fixed to the retainer wall 72. The elongate arms 84 and/or locking members 82 extend radially inwardly of the inner surface 74 a predetermined extent. As such, the locking members 82 are biased radially inwardly through the locking openings 60 of the housing 16 upon assembly to deploy the locking members 82 radially inwardly from the inner surface 25 of the tubular wall 22 forming the receiving portion 46. With the locking openings 60 being axially spaced from the upper shoulder 51, the locking members 82 in turn are axially spaced from the upper shoulder 51 by a gap G sized for captured receipt of the O-ring 68, spacer 70, and annular collar 34 of the tubular male insertion member 14 upon assembly, wherein the locking members 82 are restrained against substantial axial and rotational movement within their corresponding locking openings 60 due to a close fit therein to prevent removal of the locking members 82 from the locking opening 60. The elongate arms 84 are formed being arcuate, as a monolithic piece of material with the cylindrical wall 72, such as in a molding process, by way of example and without limitation. The arms 84 are hingedly supported by a hinge or hinge-like connection 86 to the wall 72, wherein the arms 84 arch from the hinge connection 86 to the locking members 82 that extend radially inwardly a sufficient amount to extend radially inwardly from the inner surface of the housing wall 22 upon assembly thereto, as discussed above.

The locking members 82 have opposite radially facing surfaces 88, opposite axially facing surfaces 90, 91 facing the proximal and distal ends 78, 80, respectively, and opposite sides 92 extending between the opposite radially facing surfaces 88 and the opposite axially facing surfaces 90, 91. The opposite sides 92 are flat or substantially flat, radially extending surfaces configured in parallel or substantially parallel relation with one another and in parallel or substantially parallel relation with the substantially flat sides 61 of the opening 60. As such, any relative torsional movement between the locking members 82 and the openings 60 causes the sides 92 of the locking members 82 to confront and lockingly abut the sides 61 of the locking openings 60, whereupon the sides 92, 61 act as stop surfaces, such that the locking members 82 remain fully retained within the locking openings 60 to prevent substantial relative rotation between the housing 16 and the retaining member 18.

Figure 4A:
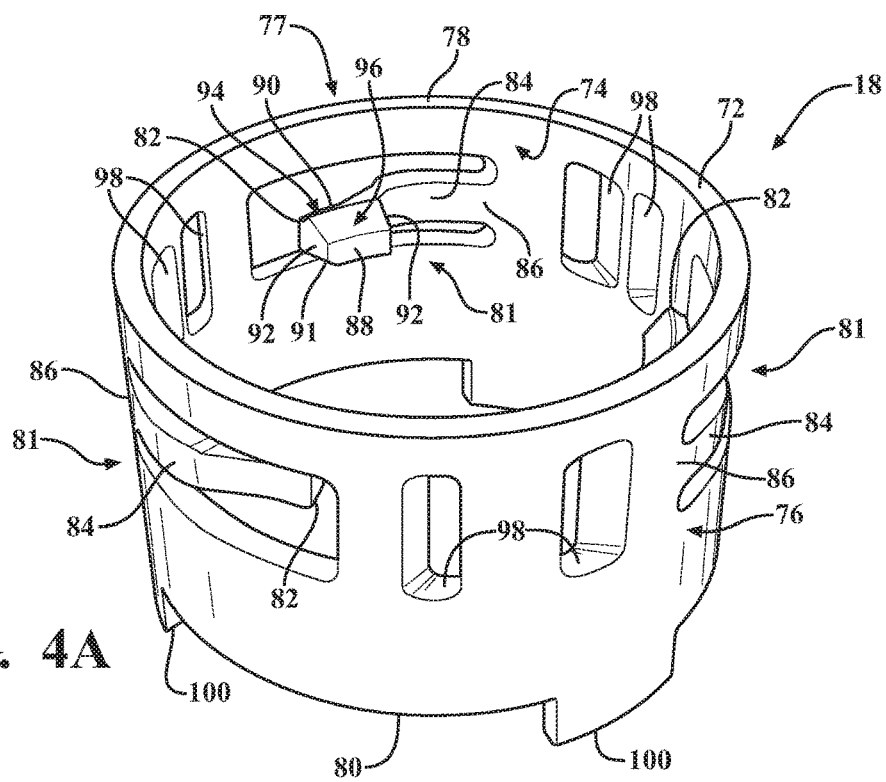
FIG. 4A is a side isometric view of a retainer of the quick connector of FIG. 1.
Figure 4B:
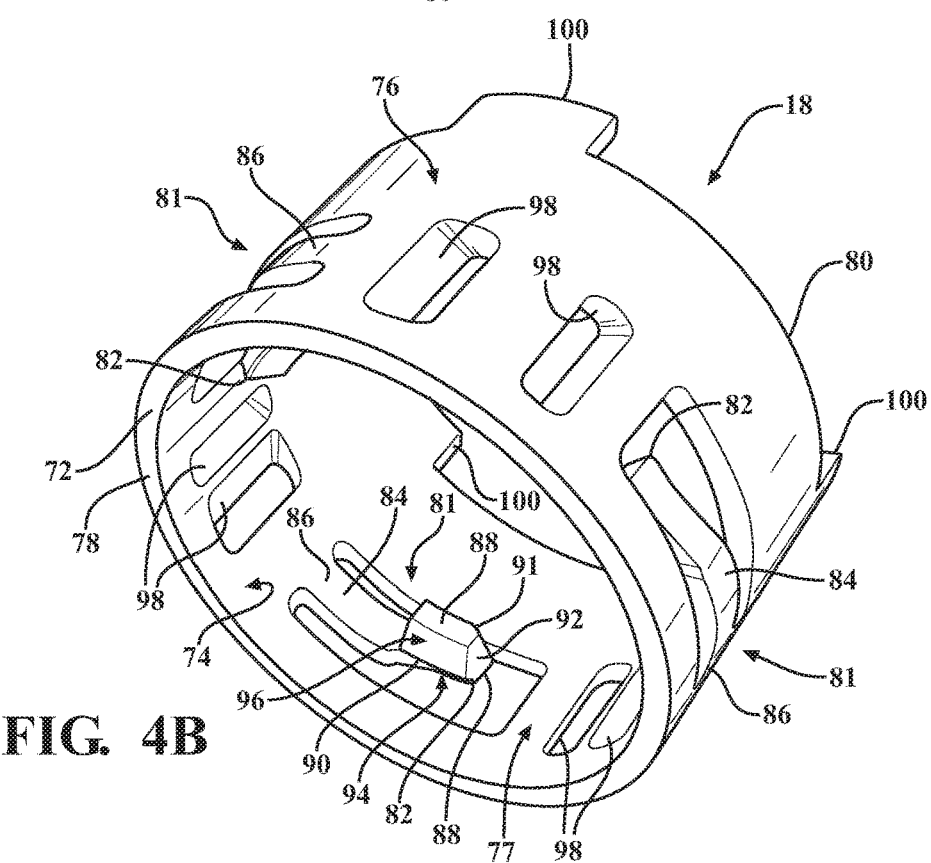
FIG. 4B is a top isometric view of the retainer of the quick connector of FIG. 1.
Figure 4C:
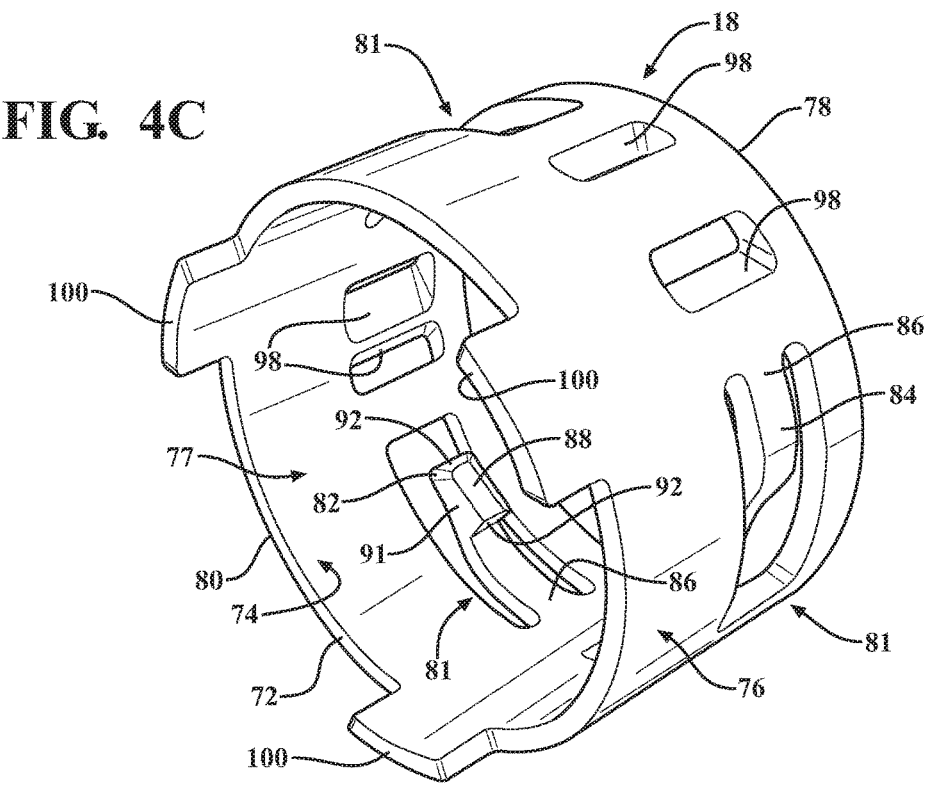
FIG. 4C is a bottom isometric view of the retainer of the quick connector of FIG. 1.
Figure 4D:
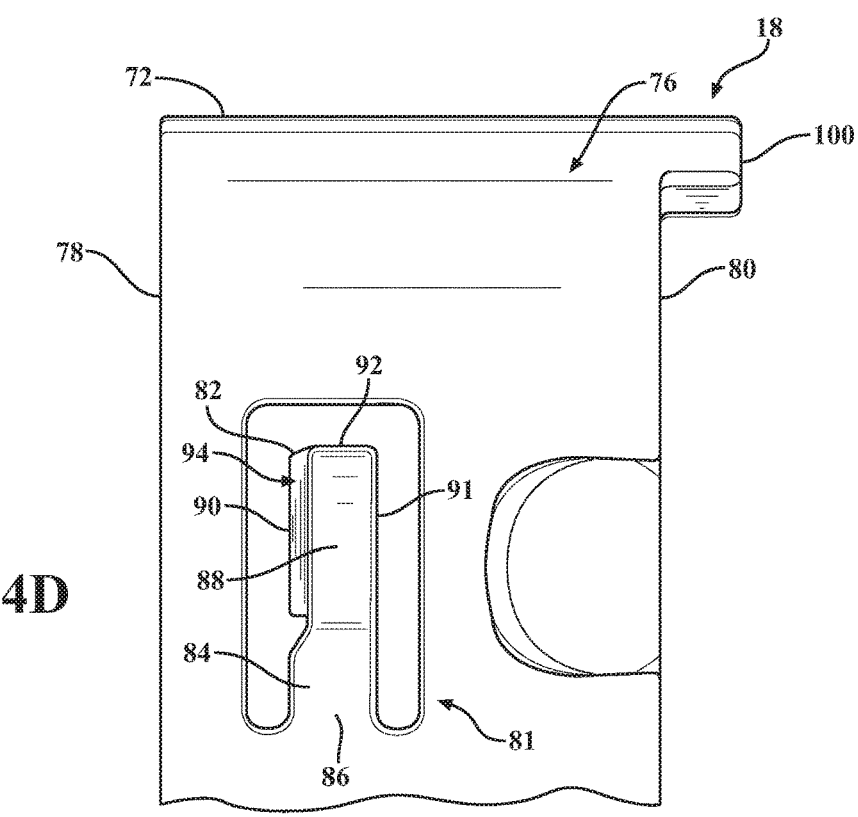
FIG. 4D is a side view of the retainer of the quick connector of FIG. 1.
Figure 4E:
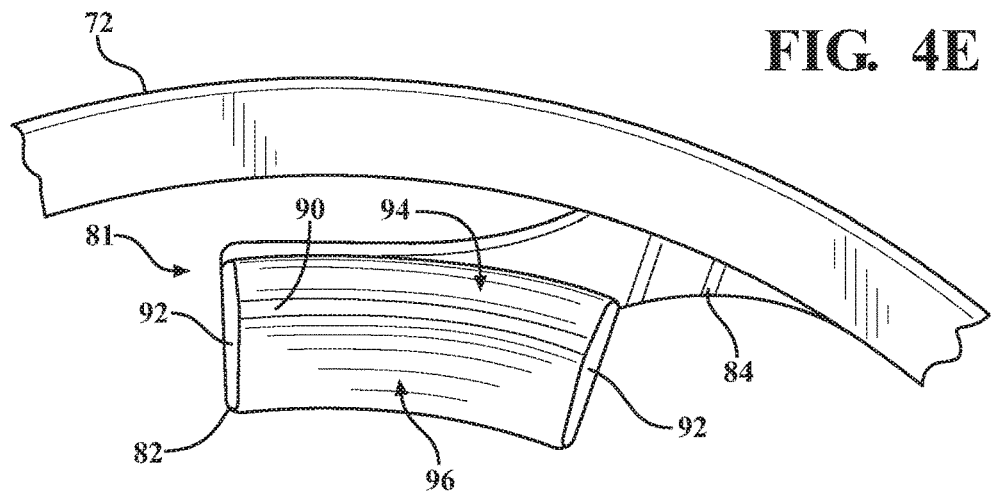
FIG. 4E is a fragmentary top view of the retainer of the quick connector of FIG. 1.
Figure 5:
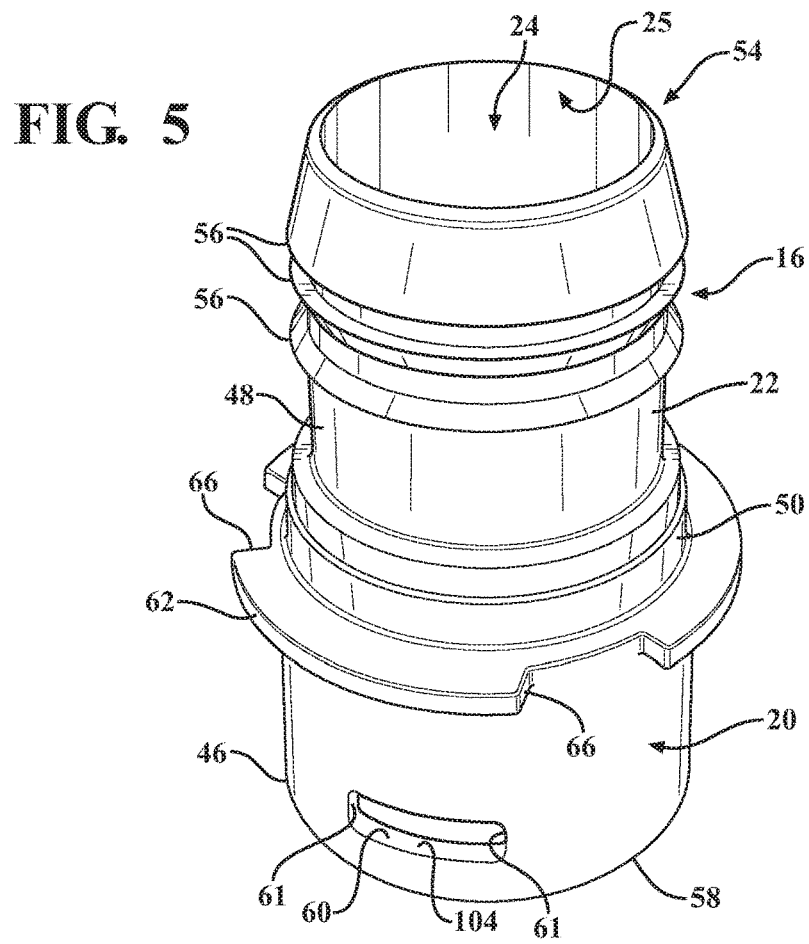
FIG. 5 is a side isometric view of a housing of the quick connector assembly of FIG. 1.

As best shown in FIG. 4E, the axially facing surface 90 of the locking member 82 facing the proximal end 78 of the retaining member 18 has a radially outwardly facing first inclined surface 94 and a radially inwardly facing second inclined surface 96. The first and second inclined surfaces 94, 96 converge toward the proximal end 78 of the retaining member 18. The axially facing surface 91 of the locking member 82 facing the distal end 80 of the retaining member 18 is substantially flat, extending generally transversely to the central longitudinal axis A. To facilitate reducing the weight of the connector 10, the wall 72 can be formed having at least one, and shown as a plurality of windows, also referred to as cutout regions 98. In the embodiment shown, a pair of cutout regions is formed between each of the locking members 82.

The retaining member 18 further includes an anti-rotation feature, provided as at least one tab, and shown as a plurality of tabs 100. The tabs 100 extend axially from the distal end 80 of the retaining member 18 for receipt in the notches 66 to prevent substantial relative rotation between the housing 16 and the retaining member 18. Accordingly, the tabs 100 provide an anti-rotation mechanism in combination with the locking members 82. It is contemplated that the tabs 100 can be sized relative to the notches 66 to provide the bulk or majority of anti-rotation, with the tolerances between the tabs 100 and the notches 66 providing a relatively snug fit, thus, acting to minimize the amount of torsion placed on the locking members 82, though being capable of withstanding torque to prevent relative rotation and removal of the locking members 82 from the locking openings 60.

Figure 2A:
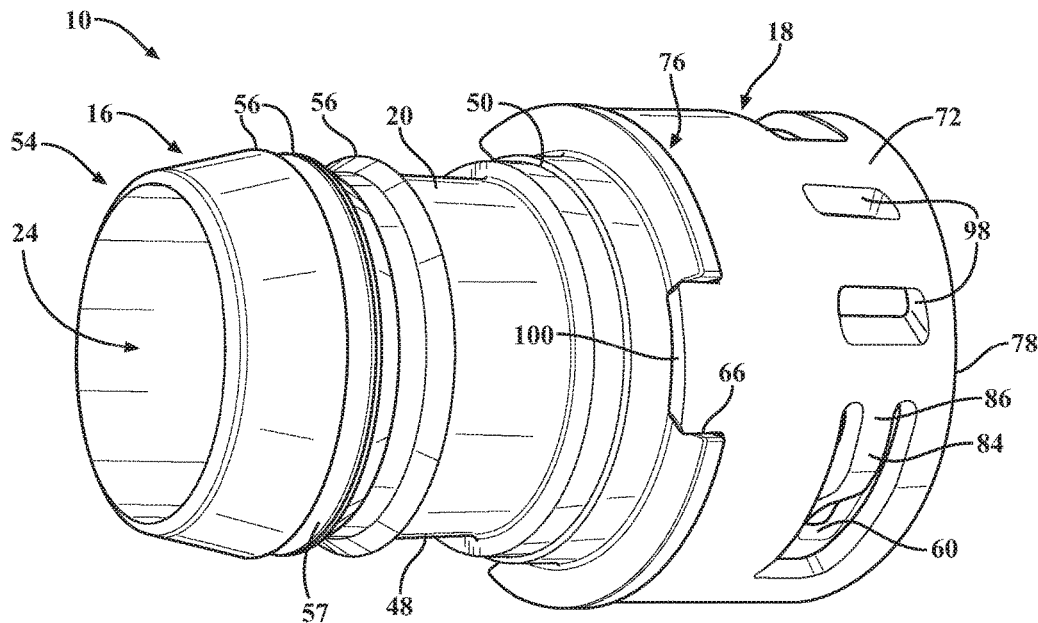
FIG. 2A is an assembled isometric view of the quick connector assembly components of FIG. 1.
Figure 2B:
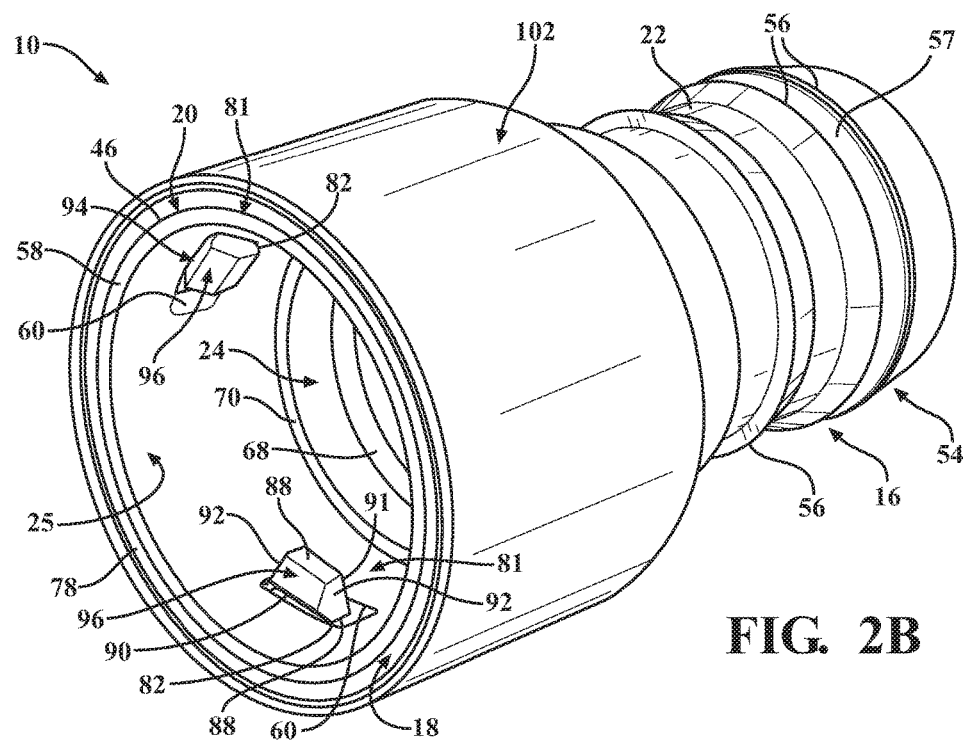
FIG. 2B is an assembled partial isometric view of the quick connector assembly components of FIG. 1 with a shrink tube assembled thereabout.

As shown in FIG. 2B, upon coupling and fixing the retaining member 18 about the housing 16, with the locking members 82 being disposed and fixed in the locking openings 60, a protective sleeve 102 can be disposed about the retaining member 18 to cover the outer surface 76 the retaining member 18. The protective sleeve 102 provides a backup assurance that the locking members 82 remain in their "as locked" positions, locked against the collar 34 of the insertion member 14, thereby blocking the insertion member 14 against removal from the housing 16. It is to be recognized that in order for the protective sleeve 102 to perform its backup function, it only need cover the locking mechanism 81, and thus, it need not cover the entirety of the retaining member 18, though shown as extending over the entirety of the retaining member 18 and about the flange 62 of the housing 16. By extending over the flange 62, the sleeve 102 is provided with added retention, thereby acting to provide additional assurance that sleeve 102 remains fixed over the locking mechanism 81, thus, further preventing radially outward movement of the arms 84 and locking members 82 fixed thereto. It is to be understood that the sleeve 102 can be provided of the desired snug fitting material, and in one exemplary embodiment, the sleeve 102 was provided as a heat-shrink tubular material, thereby allowing the sleeve 102 to be readily disposed about the retaining member 18 and the flange 62, and then be subsequently heated, thereby causing the sleeve 102 to constrict in shrinking fashion into a snug, fixed fit as shown. Aside from the sleeve 102 function to prevent the locking mechanism 81 from moving out of locked engagement with the collar 34, the sleeve 102 also functions as a tamper-resistant member to prevent disassembly of the insertion member 14 from the housing 16 without breaking or destroying one of the components of the assembly 12. Accordingly, visual evidence will exist indicating tampering if the "as assembled" components become disconnected from one another.

Figure 3:
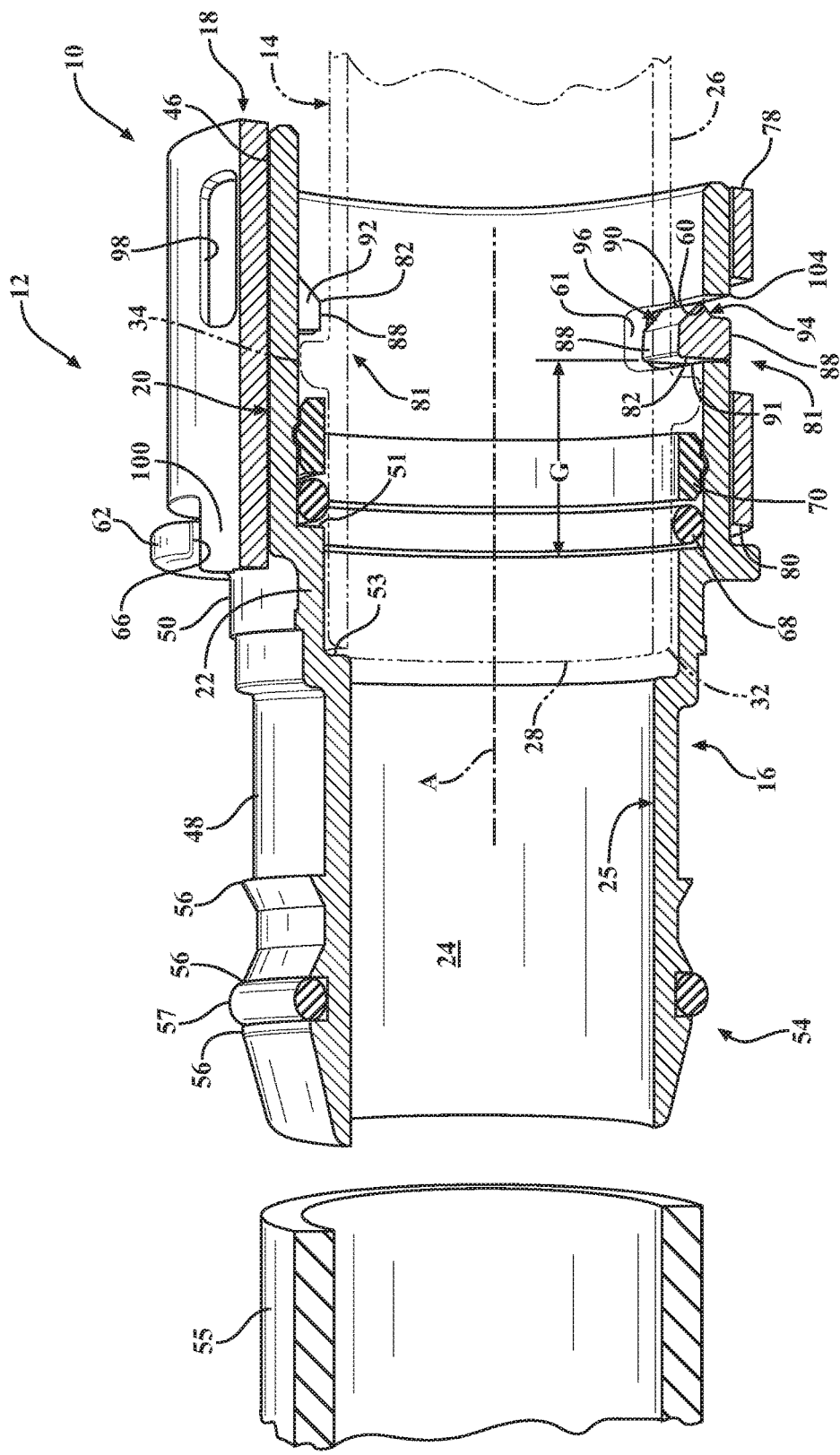
FIG. 3 is a cross-sectional view of the quick connector assembly of FIG. 2 with an insertion member shown in phantom therein.

In assembly, with the O-ring 68 and spacer sleeve 70 disposed against the upper shoulder 51, the retaining member 18 is disposed axially onto and about the receiving portion 46 of the housing 16 along the longitudinal central axis A. Upon reaching the assembled state, the locking mechanism 81 snaps into the locked state, whereupon the elongate, resilient arms 84 bias the locking members 82 radially inwardly through the locking openings 60 and radially inwardly of the inner surface 25 of the housing 16 (FIG. 3). With the retaining member 18 fixed to the housing 16, the protective sleeve 102 can be disposed and fixed in position about the locking mechanism 81 and optionally about the flange 62 for added retention, as discussed above.

With the retaining member 18 locked about the housing 16, the insertion member 14 is disposed axially along the axis A into the housing 16. The insertion end 28 of the male insertion member 14 is inserted into the housing 16 until the leading shoulder 36 of the annular collar 34 engages the beveled cam edge formed by the radially inwardly facing second inclined surface 96 of the locking member 82 to spring bias the locking member 82 resiliently and slightly radially outwardly from the male insertion member 14, thus allowing the annular collar 34 to pass axially beyond the locking member 82 into the gap G between the locking member 82 and upper shoulder 51 of the housing 16. Upon the collar 34 fully clearing and passing beyond the locking member 82, the locking member 82 automatically snaps audibly and resiliently radially inwardly to return to its unbiased or substantially unbiased position, as biased by the elongate resilient arm 84 when deflected radially outwardly, to rest in the gap G.

With the collar 34 received in the gap G, the radially inwardly facing surface 88 of the locking member rests against the shaft portion 26 of the male insertion member 14 or is in close proximity thereto and the axially facing surfaces 90, 91 rest in close proximity or against the trailing shoulder 38 of the collar 34 and the upper shoulder 51 of the housing 16. With the locking member 82 properly positioned immediately adjacent the trailing shoulder 38 of the collar 34, the insertion member 14 is prevented from moving axially outwardly from the housing 16, and therefore the male insertion member 14 is fixedly locked inside the housing 16 with a fluid/gas-tight sealed connection established therebetween. If any axially applied force is applied between the insertion member 14 and the housing 16, tending to move the insertion member 14 outwardly from the housing 16, the radially outwardly facing first inclined surface 94 of the locking member 82 is brought into camming engagement with a flat or generally flat, radially extending surface 104 of the locking opening 60, whereupon the locking member 82 is caused to be driven further radially inwardly into an increased locked position. Accordingly, reassurance is provided that the locked connection is maintained between the insertion member 14 and the housing 16, even under axially applied forces tending to move the insertion member 14 outwardly from the housing 16.

Further prevention of inadvertent, unwanted removal of the locking members 82 from the locking openings 60 is provided under torsion and relative twisting rotation between the housing 16 and the retaining member 18 as a result of the opposite sides 92 of the locking members 82 being flat or substantially flat, radially extending surfaces in close proximity with the flat or substantially flat sides 61 of the locking opening 60. The opposite sides 92 of the locking members 82 and the opposite sides 61 of the locking openings 60 are parallel or substantially parallel with one another, extending in a radial direction, and thus, if they come into abutment with one another, they act as mutual stop surfaces against one another, thereby preventing further relative rotation between the housing 16 and the retaining member 18. Of course, as discussed above, the tabs 100 and notches 66 in which the tabs 100 are received also function to prevent relative rotation between the housing 16 and the retaining member 18. Accordingly, upon connecting the insertion member 14 into the connector 10 to form the assembly 12, the insertion member 14 is assured of being in proper liquid/gas-tight connection therein, and is further prevented from inadvertent removal and is further prevented from tampering. As such, upon completing the assembly 12 as discussed and shown, no additional assurances, such as sensors and the like, are needed to ensure the connection is made and maintained.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A quick connector for permanently locked, non-disconnectable receipt of a tubular male insertion member, having a radially outwardly extending annular collar located between opposite ends, therein to facilitate establishing a connection between conduits, comprising:

a housing having a tubular housing wall with an inner surface and an outer surface extending along a central longitudinal axis between open opposite ends with at least one locking opening extending through said housing wall, said inner surface bounding a through bore and having a shoulder extending radially inwardly from at least a portion thereof; and a retaining member having an annular retainer wall with inner and outer surfaces extending axially along said central longitudinal axis between open proximal and distal ends, said inner surface of said retaining member being sized for receipt about at least a portion of said outer surface of said housing wall, said retainer wall having at least one locking member cantilevered by an elongate arm fixed to said retainer wall, said elongate arm biasing said at least one locking member radially inwardly through said at least one opening to deploy said at least one locking member radially inwardly from said inner surface of said tubular wall in axially spaced relation from said shoulder by a gap sized for captured receipt of the annular collar of the tubular male insertion member, said at least one locking member being restrained against substantial axial and rotational movement within said at least one opening to prevent removal of said at least one locking member from said at least one opening; and a sleeve overlying said at least one locking member and preventing said at least one locking member from moving radially outwardly from said at least one opening.

2. The quick connector of claim 1, wherein said sleeve is a heatshrunk tube.

3. The quick connector of claim 1, further including an annular flange extending radially outwardly from said outer surface of said housing, said annular flange having at least one notch, at least one tab extending axially from said distal end of said retaining member for receipt in said at least one notch to prevent substantial relative rotation between said housing and said retaining member.

4. The quick connector of claim 3, wherein said flange has a plurality of said at least one notch and said retaining member has a plurality of said at least one tab.

5. The quick connector of claim 1, wherein said at least one locking member has opposite radially facing surfaces, opposite axially facing surfaces facing said proximal and distal ends, and opposite sides extending between said opposite radially facing surfaces and said opposite axially facing surfaces, said opposite sides being substantially flat, radially extending surfaces configured to prevent substantial relative rotation between said housing and said retaining member.

6. The quick connector of claim 5, wherein said at least one opening has substantially flat sides configured to confront said opposite sides of said at least one locking member to prevent substantial relative rotation between said housing and said retaining member.

7. The quick connector of claim 6, wherein said substantially flat opposite sides of said at least one locking member and said substantially flat sides of said at least one opening are substantially parallel with one another.

8. The quick connector of claim 5, wherein said axially facing surface of said locking member facing said proximal end of said retaining member has a radially outwardly facing first inclined surface and a radially inwardly facing second inclined surface, said first and second inclined surfaces converging toward said proximal end.

9. The quick connector of claim 8, wherein said axially facing surface of said locking member facing said distal end of said retaining member is substantially flat, extending generally transversely to said central longitudinal axis.

10. A quick connector assembly, comprising:
- a tubular male insertion member having a radially outwardly extending annular collar located between opposite ends;
- a housing having a tubular housing wall with an inner surface and an outer surface extending along a central longitudinal axis between open opposite ends with at least one locking opening extending through said housing wall, said inner surface bounding a through bore and having a shoulder extending radially inwardly from at least a portion thereof; and
- a retaining member having an annular retainer wall with inner and outer surfaces extending axially along said central longitudinal axis between open proximal and distal ends, said inner surface of said retaining member being sized for receipt about at least a portion of said outer surface of said housing wall, said retainer wall having at least one locking member cantilevered by an elongate arm fixed to said retainer wall, said elongate arm biasing said at least one locking member radially inwardly through said at least one opening radially inwardly from said inner surface of said tubular wall, said annular collar of said tubular male insertion member being disposed between said shoulder and said at least one locking member in axial alignment therewith, said at least one locking member being restrained against substantial axial and rotational movement within said at least one opening and being locked within said at least one opening to prevent removal of said tubular male insertion member from said housing; and
- a sleeve overlying said at least one locking member and preventing said at least one locking member from being removed from said at least one opening.

11. The quick connector assembly of claim 10, wherein said sleeve is a heatshrunk tube.

12. The quick connector assembly of claim 10, further including an annular flange extending radially outwardly from said outer surface of said housing, said annular flange having at least one notch, at least one tab extending axially from said distal end of said retaining member for close receipt in said at least one notch to prevent substantial relative rotation between said housing and said retaining member.

13. The quick connector assembly of claim 12, wherein said flange has a plurality of said at least one notch and said retaining member has a plurality of said at least one tab.

14. The quick connector assembly of claim 10, wherein said at least one locking member has opposite radially facing surfaces, opposite axially facing surfaces facing said proximal and distal ends, and opposite sides extending between said opposite radially facing surfaces and said opposite axially facing surfaces, said opposite sides being substantially flat, radially extending surfaces configured to prevent substantial relative rotation between said housing and said retaining member.

15. The quick connector assembly of claim 14, wherein said at least one opening has substantially flat sides configured to confront said opposite sides of said at least one locking member to prevent substantial relative rotation between said housing and said retaining member.

16. The quick connector assembly of claim 15, wherein said substantially flat opposite sides of said at least one locking member and said substantially flat sides of said at least one opening are substantially parallel with one another.

17. The quick connector assembly of claim 15, wherein said axially facing surface of said locking member facing said proximal end of said retaining member has a radially outwardly facing first inclined surface and a radially inwardly facing second inclined surface, said first and second inclined surfaces converging toward said proximal end.

18. The quick connector assembly of claim 17, wherein said axially facing surface of said locking member facing said distal end of said retaining member is substantially flat, extending generally transversely to said central longitudinal axis.

19. A method of coupling a quick connector assembly comprising:
- providing tubular male insertion member having a radially outwardly extending annular collar located between opposite ends;
- disposing the tubular male insertion member within a tubular housing wall of a housing;
- disposing a retainer wall annularly about the tubular housing wall of the housing;
- biasing at least one locking member of the retainer wall, by an elongate arm attached thereto, radially inwardly through at least one opening in the tubular housing wall to capture the annular collar of the tubular male insertion member within the housing;
- disposing a sleeve annularly about the at least one locking member to restrain the at least one locking member against substantial movement radially outwardly from the at least one opening to prevent removal of the at least one locking member from the at least one opening.

20. The method of coupling a quick connector assembly of claim 19, wherein the sleeve includes a heatshrunk tube that shrinks in response to being heated, and wherein the method further comprises:
- heating the sleeve to shrink the heatshrunk tube about the retainer wall to prevent disassembly of the quick connector assembly without leaving visual evidence of tampering.

* * * * *